US009576231B1

(12) United States Patent
Briggs et al.

(10) Patent No.: US 9,576,231 B1
(45) Date of Patent: Feb. 21, 2017

(54) INTERPRETING A MATRIX CODE WITH INCREASED INFORMATION DENSITY

(71) Applicant: International Business Machines Corporation, Armonk, NY (US)

(72) Inventors: Simon A. S. Briggs, Winchester (GB); James K. Hook, Eastleigh (GB); Hamish C. Hunt, Ashford (GB); Nicholas K. Lincoln, Middle Wallop (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/842,941

(22) Filed: Sep. 2, 2015

(51) Int. Cl.
*G06K 19/06* (2006.01)
(52) U.S. Cl.
CPC .............................. *G06K 19/06037* (2013.01)
(58) Field of Classification Search
USPC ...... 235/494, 487, 462.06, 462.08, 386, 375
See application file for complete search history.

(56) References Cited

U.S. PATENT DOCUMENTS

| 7,938,330 B2 | 5/2011 | Kiuchi et al. |
| 8,448,864 B2 | 5/2013 | Kuyper-Hammond et al. |
| 8,668,137 B2 | 3/2014 | Herzig |
| 2002/0158128 A1* | 10/2002 | Ashiura .................. G06K 7/14 235/462.01 |
| 2006/0097062 A1* | 5/2006 | Cheong ............ G06K 19/06037 235/494 |
| 2008/0191023 A1* | 8/2008 | Harris .............. G06K 19/06028 235/462.1 |
| 2008/0290175 A1* | 11/2008 | Chen ...................... G06K 19/16 235/487 |
| 2009/0212113 A1* | 8/2009 | Chiu ........................ G06K 7/14 235/462.41 |
| 2009/0242643 A1* | 10/2009 | Nakamura ........... G06K 7/1443 235/462.06 |

(Continued)

OTHER PUBLICATIONS

André et al.; "Colour multiplexing of quick-response (QR) codes"; Electronics Letters; Nov. 20, 2014; pp. 1828-1830; vol. 50; No. 24; IET.

(Continued)

*Primary Examiner* — Allyson Trail
(74) *Attorney, Agent, or Firm* — Steven F. McDaniel; Andrew G. Morabito

(57) ABSTRACT

In an approach for interpreting a matrix code with increased information density, a processor identifies a first portion of an extended matrix code and a second portion of the extended matrix code, where each portion of the extended matrix code has a different combination of at least one positioning marker and at least one location marker. A processor locates at least one location marker of the first portion of the extended matrix code and at least one location marker of the second portion of the extended matrix code. A processor concatenates the first portion of the extended matrix code and the second portion of the extended matrix code based on at least one location marker of the first portion of the extended matrix code and at least one location marker of the second portion of the extended matrix code. A processor generates the extended matrix code.

17 Claims, 6 Drawing Sheets

(56) References Cited

U.S. PATENT DOCUMENTS

| | | | | |
|---|---|---|---|---|
| 2010/0084469 | A1* | 4/2010 | Kuyper-Hammond | G06K 19/06037 235/462.01 |
| 2011/0221846 | A1* | 9/2011 | Smith | G06K 1/121 347/107 |
| 2012/0067943 | A1* | 3/2012 | Saunders | G06K 7/1095 235/375 |
| 2012/0298745 | A1 | 11/2012 | Kuyper-Hammond et al. | |
| 2015/0069140 | A1 | 3/2015 | Ming et al. | |
| 2015/0365635 | A1* | 12/2015 | Jose | H04N 7/185 348/14.07 |
| 2016/0086072 | A1* | 3/2016 | Castillo | G06K 19/06037 235/494 |

OTHER PUBLICATIONS

Bulan et al.; "Color QR Codes: Increased Capacity Via Per-Channel Data Encoding and Interference Cancellation"; 19th Color and Imaging Conference Final Program and Proceedings; 2011; pp. 156-159; Society for Imaging Science and Technology.

Chiang et al.; "High Density QR Code with Multi-View Scheme"; 2013 IEEE 17th International Symposium on Consumer Electronics (ISCE); Jun. 3-6, 2013; pp. 49-50; IEEE.

Dennis, Tony; "NeoMedia bags Microsoft as an IP licensee"; GoMo News; Aug. 22, 2012; pp. 1-3; <http://www.gomonews.com/neomedia-bags-microsoft-as-an-ip-licensee/>.

Grillo et al.; "High Capacity Colored Two Dimensional Codes"; Proceedings of the International Multiconference on Computer Science and Information Technology; Oct. 18-20, 2010; pp. 709-716; IEEE.

Lenticular; "World First 2-view QR-Code Printed on LenBB Lenticular"; YouTube; Feb. 28, 2008; <https://www.youtube.com/watch?v=WLOALK2skQo>.

Lunden, Ingrid; "Chasing Apple? Microsoft's NeoMedia QR Code Patent Deal Puts More Focus on Geometric Boxes"; TechCrunch; Aug. 22, 2012; pp. 1-7; <http://techcrunch.com/2012/08/22/chasing-apple-microsofts-neomedia-qr-code-patent-deal-puts-more-focus-on-geometric-boxes/>.

Sakr, Sharif; "Dual-lens smartphone cameras are coming, and this is why we want one"; Engadget; Feb. 26, 2014; pp. 1-6; <http://www.engadget.com/2014/02/26/corephotonics-dual-lens-smartphone-camera/>.

Soon, Tan Jin; "QR Code"; Synthesis Journal; Section Three; 2008; pp. 59-78.

"Barcode"; Wikipedia, the free encyclopedia; last modified Apr. 24, 2015; pp. 1-8; <http://en.wikipedia.org/wiki/Barcode#Matrix_.282D.29_barcodes>.

"Gavin Jancke"; Microsoft Research; Printed Sep. 1, 2015; pp. 1-3; <http://research.microsoft.com/en-us/people/gavinj/default.aspx#PersonalResearchProjects>.

"3800g HD Linear-Imaging Scanner"; Honeywell; Printed Sep. 1, 2015; p. 1; © 2015 Honeywell International Inc.; <https://www.honeywellaidc.com/en-US/Pages/Product.aspx?category=handheld-barcode-scanner&cat=HSM&pid=3800gHD>.

"QRCode.com"; Denso Wave; Printed Apr. 24, 2015; pp. 1-2; <http://www.qrcode.com/en/>.

"Voiceeye—Making printed material accessible"; ViewPlus Technologies, Inc.; Printed Apr. 24, 2015; pp. 1-2; <http://voiceye.viewplus.com/>.

* cited by examiner

INTERPRETING A MATRIX CODE WITH INCREASED INFORMATION DENSITY

BACKGROUND

The present invention relates generally to the field of matrix code, and more particularly to increasing the information density within the frame of the matrix code.

Barcodes are a commonplace mechanism for encoding short pieces of data in a machine-readable format. Barcodes are abundant in consumer packaging in the Universal Product Code (UPC) format, which is a linear or 1-dimensional barcode. More recently 2-dimensional formats, such as quick response (QR) codes or datamatrix codes, are being utilized. Many devices are now capable of reading a printed 2-dimensional code to extract encoded data, for example a uniform resource locator (URL). The devices may be configured to launch a browser and attempt to access the URL once the 2-dimensional code has been decoded. In this manner, newspapers, advertisers and other print media are able to quickly communicate with readers an on-line version of the printed media or a related website.

SUMMARY

Aspects of the present invention disclose a method, computer program product and system for interpreting a matrix code with increased information density. A processing device identifies a first portion of an extended matrix code and a second portion of the extended matrix code, where each portion of the extended matrix code has a different combination of at least one positioning marker and at least one location marker. The processing device locates the at least one location marker of the first portion of the extended matrix code and the at least one location marker of the second portion of the extended matrix code. The processing device concatenates the first portion of the extended matrix code and the second portion of the extended matrix code based on the at least one location marker of the first portion of the extended matrix code and the at least one location marker of the second portion of the extended matrix code. The processing device generates the extended matrix code.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "frame", or "system." Furthermore, aspects of the present invention may take the form of a computer program product embodied in one or more computer readable medium(s) having computer readable program code/instructions embodied thereon.

Embodiments of the present invention discloses an approach to increasing the information density within a matrix code. Embodiments of the present invention disclose an approach for extracting a greater amount of information from a matrix code, which decreases the amount of space required for the matrix code frames.

Two-dimensional barcodes, used to encode binary information on surfaces, have information density limits due to resolution limitations of reading equipment. For applications where the available encoding surface may be scaled according to the data requirements, this does not cause a problem. However, for applications that have a limited encoding space this restricts the amount of usable data that may be stored. The space available for encoding a 2-dimensional barcode is limited which restricts the size of the image that may be stored which means that only low resolution images may be used.

The present invention will now be described in detail with reference to the Figures.

Figure 1:
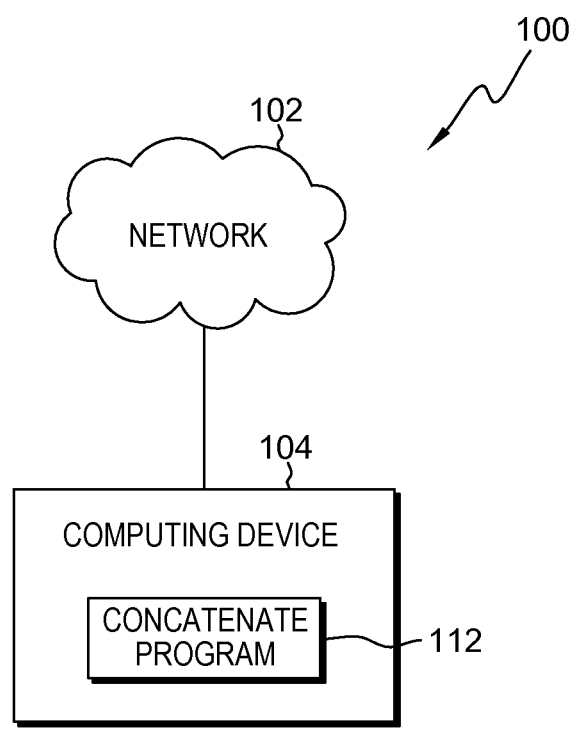
FIG. 1 depicts a block diagram depicting a computing environment, in accordance with one embodiment of the present invention.

FIG. 1 depicts a block diagram of computing environment 100 in accordance with one embodiment of the present invention. FIG. 1 provides an illustration of one embodiment and does not imply any limitations regarding computing environment 100 in which different embodiments may be implemented. In the depicted embodiment, computing environment 100 includes, but is not limited to and network 102 and computing device 104. Computing environment 100 may include additional computing devices, servers, computers, components, or additional devices not shown. It should be appreciated FIG. 1 provides only an illustration of one implementation and does not imply any limitations with regard to the environments in which different embodiments may be implemented. Many modifications to the depicted environment may be made.

Network 102 may be a local area network (LAN), a wide area network (WAN) such as the Internet, any combination thereof, or any combination of connections and protocols support communications between computing device 104 and additional computing devices connected to network 102 in accordance with embodiments of the invention. Network 102 may include wired, wireless, or fiber optic connections.

Computing device 104 may be a desktop computer, laptop computer, tablet computer, netbook computer, personal computer (PC), a desktop computer, mobile device, or any programmable electronic device capable reading a matrix code. Computing device 104 may be, for example a plurality of cameras or devices, wherein each camera or device reads each matrix code. In additional embodiments, computing device 104 is a single camera or device which reads each matrix code. In additional embodiments, computing device 104 may be any electronic device or computing system capable of sending and receiving data, and communicating with computing device 104 via network 102. In the depicted embodiment, computing device 104 is connected to network 102.

Concatenate program 112 controls the concatenation of a plurality of matrix codes to form an extended matrix code. Concatenate program 112 uses different markers in each of the matrix codes involved in forming the extended matrix code to locate each matrix code which is used to form the extended matrix code. Concatenate program 112 uses the markers to align the matrix codes when forming the extended matrix code. Concatenate program 112 then joins the matrix codes together to create a readable extended matrix code. In the depicted embodiment, concatenate program 112 is located on computing device 104. In additional embodiments, concatenate program 112 may be located on additional servers.

Figure 2A:
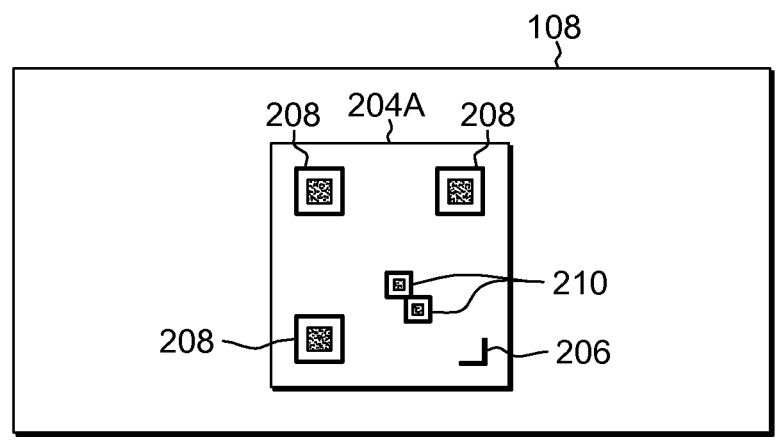
FIG. 2A depicts a matrix code, in accordance with an embodiment of the present invention.

FIG. 2A depicts a composite matrix code, in accordance with an embodiment of the present invention. FIG. 2A depicts the matrix code as presented using lenticular printing or another form of overlay several images over one another. It should be appreciated FIG. 2A provides only an illustration of one implementation and does not imply any limitations with regard to the environments in which different embodiments may be implemented.

Frame 108 represents the space which composite matrix code 204A is contained within. Frame 108 may be, for example, a label, a screen, or another surface which matrix code 204A can be printed on to or presented on. In additional embodiments, frame 108 size is determined by the intended use of composite matrix code 204A. Frame 108 may be increased, or decreased depending on the product or usage to fit composite matrix code 204A accordingly. In the depicted embodiment, frame 108 contains composite matrix code 204A. In additional embodiments, frame 108 may contain more than one composite matrix code 204A. In embodiments where more than one composite matrix code 204A is present, each composite matrix code 204A may be substantially different from one another. Each embodiment of composite matrix code 204A may be for a different purpose and contain different information compressed within.

Composite matrix code 204A is a predetermined space which contains at least two matrix codes within. An example of the matrix codes contained within composite matrix code 204A are shown and described in detail in FIG. 2B. The at least two matrix codes contained within composite matrix code 204A may contain, for example, the same information, different information, or portions of information, when the at least two matrix codes are concatenated to form the extended matrix code form a complete set of information. Within composite matrix code 204A there are a quantity of corner marker 206, primary markers 208, and alignment markers 210.

Corner marker 206 represent the external limit of a matrix code. Corner marker 206 is used by concatenate program 112 to set the limits of the matrix code to assist when analyzing the matrix code, so the proper amount of information is read by. In the depicted embodiment, composite matrix code 204A has one corner marker 206. In additional embodiments, composite matrix code 204A may have more than one corner marker 206. Position markers 208 are used by concatenate program 112 to correctly position the matrix code so concatenate program 112 may determine the proper location to being reading the matrix code as well as the correct location to stop reading the matrix code. In one embodiment, position marker 208 have a symmetrical line ratio of 1:1:3:1:1. In additional embodiments, position marker 208 may have a different line ratio, provided concatenate program 112 may locate and determine matrix code 204A position. In the depicted embodiment, composite matrix code 204A contained three position markers. In additional embodiments, composite matrix code 204A may have any quantity of position markers 208. Alignment marker 210 are used to alignment the matrix code if the matrix code is curved, distorted or if part of the matrix code is not present. An example of this is if the matrix code is broken, or presented on a bottle or can where the matrix code would appear warped. Alignment marker 210 assists concatenate program 112 in identifying reference points for alignment purposes. In the depicted embodiment, composite matrix code 204A contained two alignment markers 210. In additional embodiments, any number of alignment marker 210 may be located on composite matrix code 204A which are necessary to assist concatenate program 112 in reading composite matrix code 204A. The location of supplemental markers 204 may vary depending on the purpose and information stored within composite matrix code 204A.

Figure 2B:
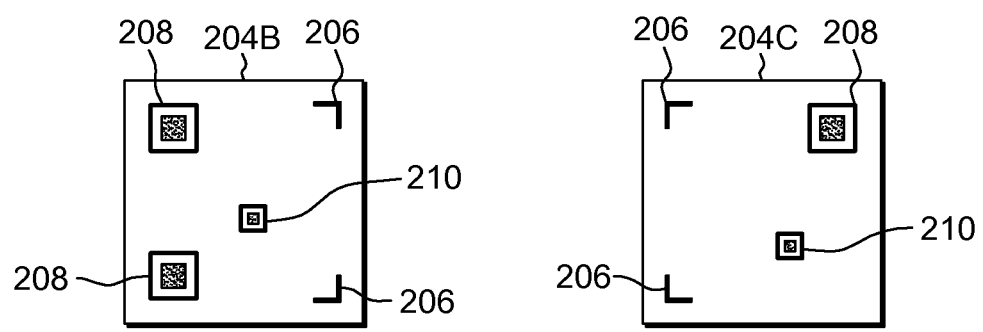
FIG. 2B depicts extracted matrix codes, in accordance with an embodiment of the present invention.

FIG. 2B depicts extracted matrix codes which are extracted from the composite matrix code, in accordance with an embodiment of the present invention. FIG. 2B depicts extracted matrix codes and the markers which are present within each individual extracted matrix code. It should be appreciated FIG. 2B provides only an illustration of one implementation and does not imply any limitations with regard to the environments in which different embodiments may be implemented.

Matrix code 204B and matrix code 204C are extracted (as described in FIG. 3 and FIG. 4 below) from composite matrix code 204A by concatenate program 112. In the depicted embodiment, matrix code 204B and matrix code 204C contain the position markers, corner markers, and alignment markers which were contained within composite matrix code 204A. In additional embodiments, composite matrix code 204A may contain any amount of extracted matrix codes. Matrix code 204B and matrix code 204C are shown having corner markers 206, primary markers 208, and supplemental markers 210. The markers operate substantially similarly to how the markers are described in FIG. 2A. Each of matrix codes 204B and 204C may include any number of corner markers 206, primary markers 208, and supplemental markers 210 which are present in composite matrix code 204A. In the depicted embodiment, matrix codes 204B and 204C include at least one of corner markers 206, primary markers 208, or supplemental markers 210. Matrix codes 204B and 204C are to be combined by concatenate program 112 to create an extended matrix code. This extraction of matrix codes 204B and 204C from composite matrix code 204A allows for a greater quantity of information to be stored in a smaller space.

Figure 3:
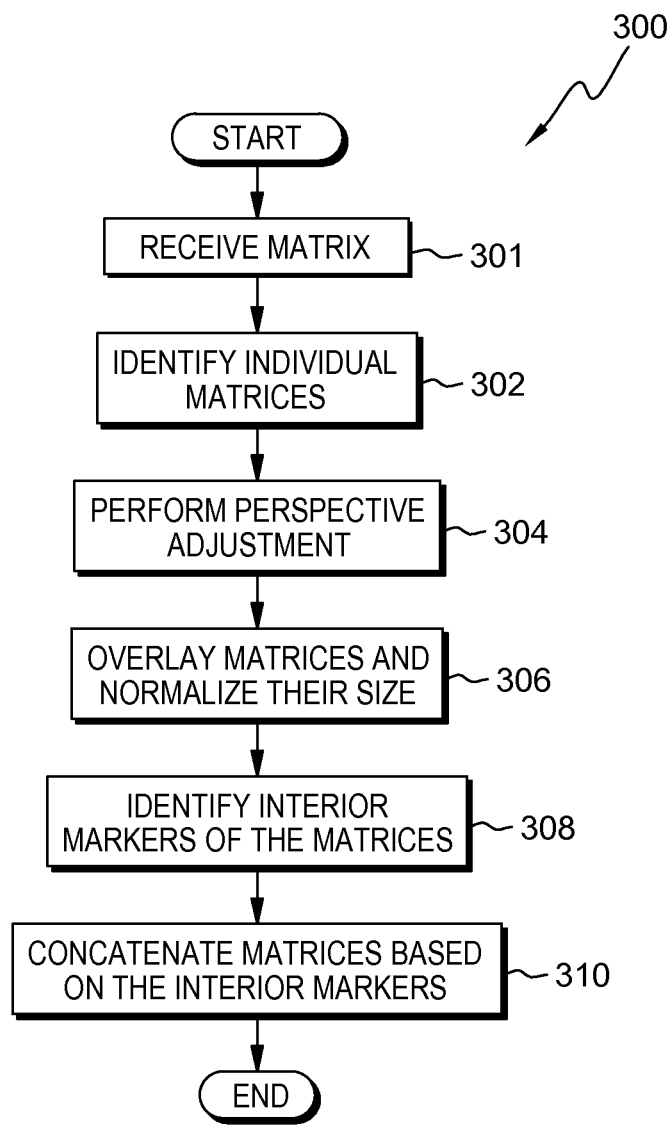
FIG. 3 depicts a flowchart of the operational steps taken by a concatenate program to merge a plurality of matrix codes together to form an extended matrix code, within computing environment of FIG. 1, in accordance with an embodiment of the present invention.

FIG. 3 depicts a flowchart of the operational steps taken by concatenate program 112 to merge a plurality of matrix codes together to form an extended matrix code, within computing environment 100 of FIG. 1, in accordance with an embodiment of the present invention. Flowchart 300 depicts the extraction of matrix code 204B and matrix code 204C from composite matrix code 204A, merger of matrix code 204B and matrix code 204C into a new extended matrix code. It should be appreciated FIG. 3 provides only an illustration of one implementation and does not imply any limitations with regard to the environments in which different embodiments may be implemented. Many modifications to the depicted environment may be made.

In step 301, concatenate program 112 receives matrix. Concatenate program 112 receives an image of a matrix code using a camera or other device which is capable of capturing images and sending the image. In one embodiment, concatenate program 112 receives composite matrix code 204A. In additional embodiments, concatenate program 112 receives several matrix codes.

In step 302, concatenate program 112 identifies the individual matrices. In one embodiment, concatenate program 112 identifies composite matrix code 204A is composed of several matrix codes. A camera or other device capable of capturing an image is used to capture an image of each matrix code contained within composite matrix code 204A. The camera may be, for example, a smartphone camera, or digital camera connected to network 102 and capable of transferring data to concatenate program 112, or another device which can capture and image and transfer the data directly to concatenate program 112 or transfer the data via network 102. This may be done, for example, by capturing several pictures at different viewing angles if composite matrix code 204A is imprinted on lenticular paper (described in FIG. 5). In additional embodiments, concatenate program 112 identifies at least two matrix codes using a camera or other device capable of capturing an image which are partially overlaid or are two distinct images. In these embodiments, concatenate program 112 identifies the matrix codes using primary markers 208.

In step 304, concatenate program 112 performs perspective adjustment. Concatenate program 112 performs the perspective adjustment to represented composite matrix code 204A to remove distortion and alignment issues. In one embodiment, concatenate program 112 uses corner marker 206 and alignment marker 210 to perform the perspective adjustment. In additional embodiments, concatenate program 112 uses corner marker 206, primary marker 208, alignment marker 210, and additional markers to perform the perspective adjustment. Concatenate program 112 aligns composite matrix code 204A such that a perpendicular view is attained, wherein composite matrix code 204A is aligned horizontally. In additional embodiments, concatenate program 112 performs the perspective adjustment so that a parallel view is attained, wherein composite matrix code 204A is aligned vertically. In additional embodiments, concatenate program 112 performs a perspective adjustment to account for intrinsic camera parameters which removes effects such as skew, distortion, and warping. In one embodiment, concatenate program 112 performs this adjustment using corner marker 206, and alignment marker 210. In additional embodiments, concatenate program 112 performs this adjustment using corner marker 206, primary marker 208, supplemental marker 210, as well as additional markers.

In step 306, concatenate program 112 normalizes the matrices sizes. Concatenate program 112 extracts matrix code 204B and matrix code 204C from composite matrix code 204A and standardizes the size of matrix code 204B and matrix code 204C. In one embodiment, concatenate program 112 normalizes the size of matrix code 204B and matrix code 204C to a size where the matrices are substantially similar in terms of height and width. In additional embodiments, concatenate program 112 normalizes the size of matrix code 204B and matrix code 204C relative to the information included within matrix code 204B and matrix code 204C. In some embodiments, this may mean having one matrix code larger than the other.

In step 308, concatenate program 112 identifies interior markers of the matrices. Concatenate program 112 identifies the interior markers of matrix code 204B and matrix code 204C. The interior markers are the markers from matrix code 204B and matrix code 204C which are to come in contact once the concatenation is performed. The interior markers may be, for example, corner marker 206, primary marker 208, and supplemental marker 210 or additional markers present within matrix code 204B and matrix code 204C.

In step 310, concatenate program 112 concatenates matrices based on the interior markers. Concatenate program 112 uses the interior markers identified to concatenate matrix code 204B and matrix code 204C to form the extended matrix code. In one embodiment, concatenate program 112 moves matrix code 204B and matrix code 204C substantially close to one another to produce the extended matrix code. Concatenate program 112 creates a single image using matrix code 204B and matrix code 204C. In additional embodiments, concatenate program 112 receives images of matrix code 204B and matrix code 204C and digitally concatenates matrix code 204B and matrix code 204C. Extended matrix code contains a set of information which was created by concatenating matrix code 204B and matrix code 204C. In one embodiment, matrix code 204B and matrix code 204C each contain a portion of the information which is contained in the extended matrix code. In additional embodiments, matrix code 204B and matrix code 204C when merged create a new set of information which is the information contained within the extended matrix code.

Figure 4:
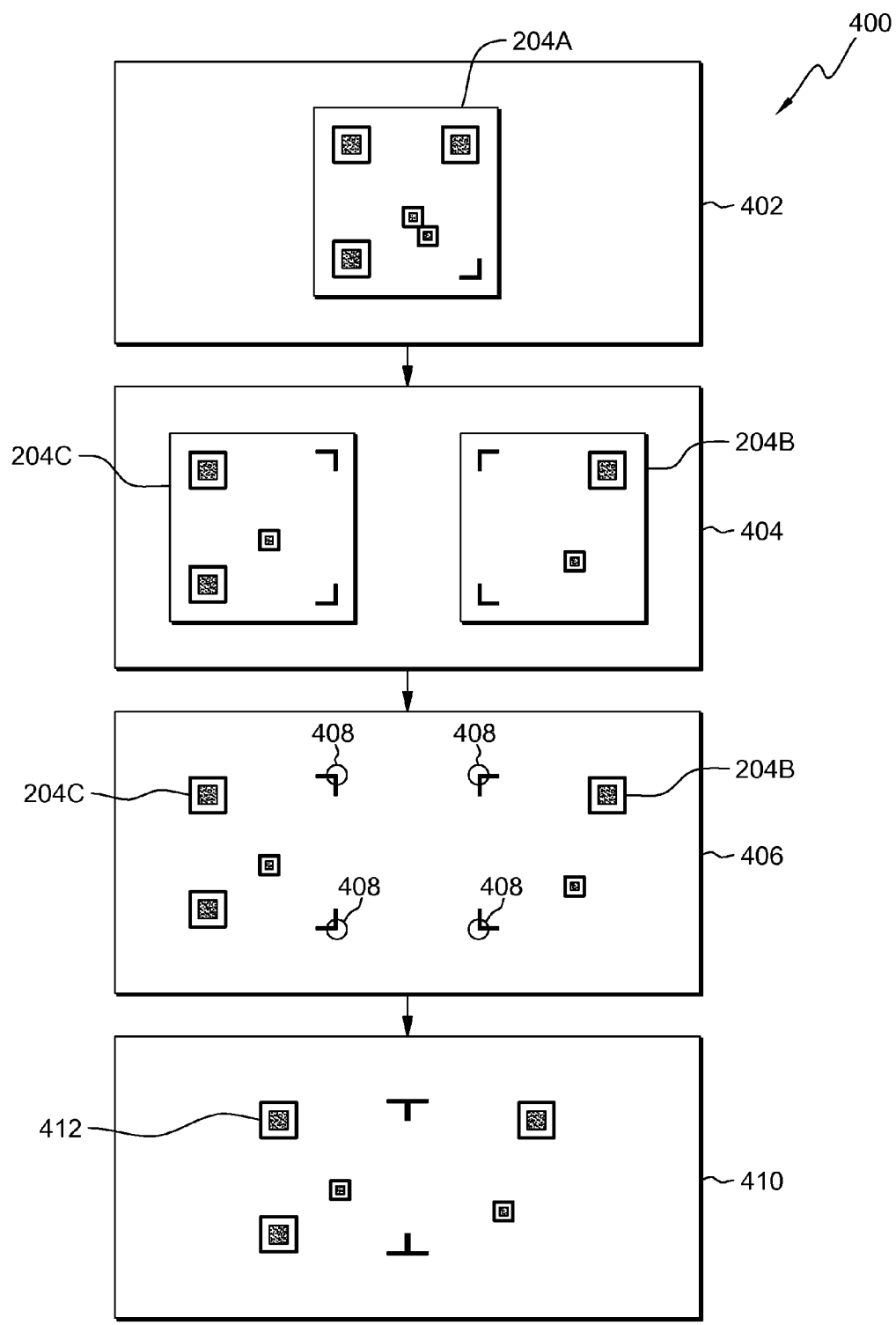
FIG. 4 depicts a representation of the steps taken by concatenate program in FIG. 3, within computing environment 100 of FIG. 1, in accordance with an embodiment of the present invention.

FIG. 4 depicts a representation of the steps taken by concatenate program 112 in FIG. 3, within computing environment 100 of FIG. 1, in accordance with an embodiment of the present invention. Diagram 400 depicts an embodiment of a visual representation of the extraction and concatenation of matrix codes. It should be appreciated FIG. 4 provides only an illustration of one implementation and does not imply any limitations with regard to the environments in which different embodiments may be implemented. Many modifications to the depicted environment may be made.

Diagram 402 is a representation of composite matrix code 204A.

Diagram 404 is a representation of the result of the operational steps performed by concatenation function 112, described in step 306 of FIG. 3. In diagram 404 matrix code 204B and matrix code 204C are shown, after having been extracted from composite matrix code 204A (shown in diagram 402).

Diagram 406 is a representation of the result of the operational steps performed by concatenation function 112, descried in step 308 of FIG. 3.

Diagram 410 is a representation of the result of the operational steps performed by concatenation function 112, descried in step 310 of FIG. 3.

Figure 5:
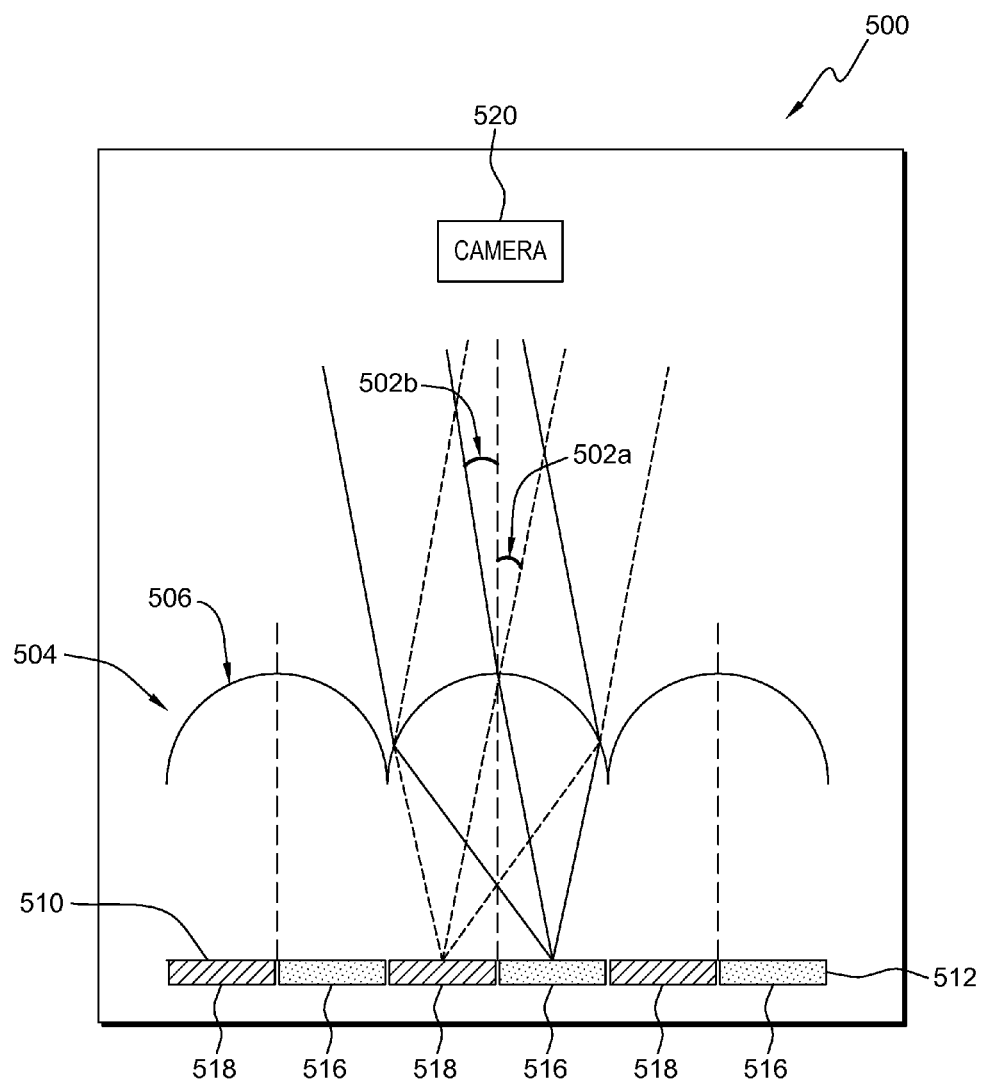
FIG. 5 depicts an illustration of a perspective view of a lenticular display system used to display two matrix codes from two different viewing angles, in accordance with an embodiment of the present invention.

FIG. 5 depicts an illustration of a perspective view of a lenticular display system used to display two matrix codes from two different viewing angles, in accordance with an embodiment of the present invention. Illustration 500 depicts one embodiment of the use of lenticular display. It should be appreciated FIG. 5 provides only an illustration of one implementation and does not imply any limitations with regard to the environments in which different embodiments may be implemented. Many modifications to the depicted environment may be made.

In the depicted embodiment, viewing angle 502a and viewing angle 502b (each or individually referred to as 502) are described. In additional embodiments there may be more than two viewing angles. In additional embodiments, there is a plurality of viewing angles 502 each viewing angle 502 has a distinct and different image associated with the viewing angles 502.

Lenticular lens 504 has ribbed surface 506 and flat surface 510. Examples of materials lenticular lens 504 are made from, may be, for example, polyvinylchloride (PVC), Amorphous Polyethylene Terephthalate (APET), acrylic, and Polyethylene Terephthalate Glycol (PETG), as well as other suitable materials. For example, suitable materials may require a suitable index of refraction as well as suitable rigidity to maintain integrity of the viewing angles 502. In one embodiment, ribbed surface 506 may be, for example a plurality of lenticules, wherein the lenticules are associated with view angles 502. In the depicted embodiment, ribbed surface 506 is cylindrical shaped. In additional embodiments, ribbed surface 506, may be, for example, spherical shaped, or any other shape which allows the user the opportunity to view multiple images at different viewing angles 502.

Lenticules of ribbed surface 506 may be substantially similar to one another. In additional embodiments, lenticules of ribbed surface 506 may be run vertically across material 512, horizontally across material 512, or both vertically and horizontally across material 512, depending on the images which are imprinted on material 512 and the number of viewing angles 502 necessary to see each of the images. In one embodiment, flat surface 510 of lenticular lens 504 comes in contact with paper 512. In additional embodiments, flat surface 510 of lenticular lens 504 comes substantially in contact with material 512. Material 512 may be, for example, paper, cardboard, plastic, or another material which can have an image imprinted on itself. Material 512 contains image 516 and image 518. Image 516 and image 518 may be, for example, distinct matrix codes, or portions of a matrix code which form extended matrix code 412.

In one embodiment, image 516 is matrix code 204B and image 518 is matrix code 204C. In additional embodiments, image 516 and image 518 may be interleaved or interlaced. In the depicted embodiment, image 516 may be viewed from angle 502a, directed to the representation of camera 520 and the image 518 may be viewed from angle 502b directed to the representation of camera 520. In additional embodiments, there are more images which are viewed at additional respective angles. Camera 520 is a single lens camera or device capable of capturing and recording images at the plurality of viewing angles 502 to capture the images imprinted on material 512. In additional embodiments, camera 520 can be a multi lens camera or device to capture an image from viewing angles 502 substantially simultaneously.

In additional embodiments, the lenticular paper may be, for example transforming images, stereoscopic (3D) effects, animations, advertising graphics, 3D prints and 3D video displays or televisions.

Figure 6:
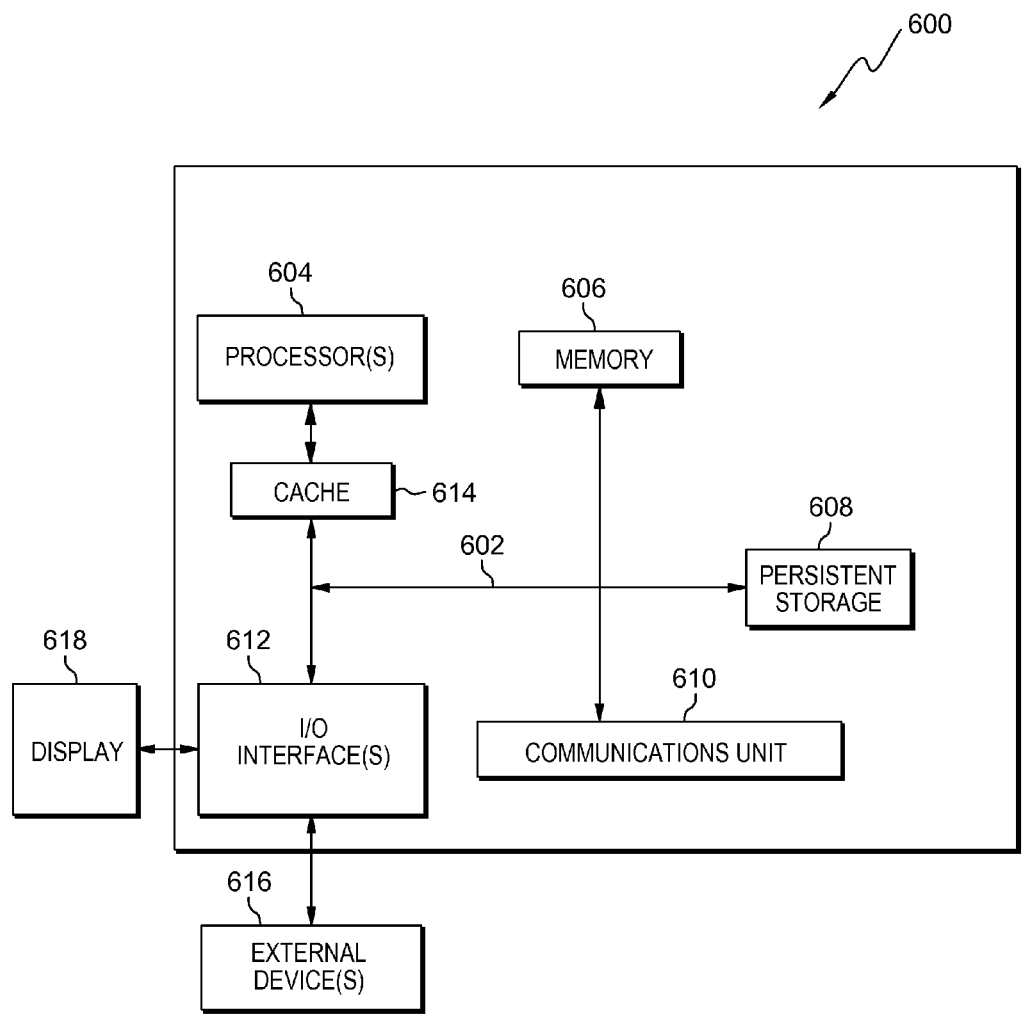
FIG. 6 depicts a block diagram depicting the internal and external components of the server and computing device of FIG. 1, in accordance with one embodiment of the present invention.

FIG. 6 depicts a block diagram 600 depicting the internal and external components of computing device 104 of FIG. 1, in accordance with one embodiment of the present invention. It should be appreciated FIG. 6 provides only an illustration of one implementation and does not imply any limitations with regard to the environments in which different embodiments may be implemented. Many modifications to the depicted environment may be made.

Computing device 104 includes communications fabric 602, which provides communications between computer processor(s) 604, memory 606, persistent storage 608, communications unit 610, and input/output (I/O) interface(s) 612. Communications fabric 602 may be implemented with any architecture designed for passing data and/or control information between processors (such as microprocessors, communications and network processors, etc.), system memory, peripheral devices, and any additional hardware components within a system. For example, communications fabric 602 may be implemented with one or more buses.

Memory 606 and persistent storage 608 are computer-readable storage media. In one embodiment, memory 606 includes random access memory (RAM) and cache memory 614. In general, memory 606 may include any suitable volatile or non-volatile computer-readable storage media.

Memory 606 is stored for execution by one or more of the respective computer processors 604 of computing device 104 via one or more memories of memory 606 of computing device 104. In the depicted embodiment, persistent storage 608 includes a magnetic hard disk drive. Alternatively, or in addition to a magnetic hard disk drive, persistent storage 608 may include a solid state hard drive, a semiconductor storage device, read-only memory (ROM), erasable programmable read-only memory (EPROM), flash memory, or any additional computer-readable storage media that is capable of storing program instructions or digital information.

The media used by persistent storage 608 may also be removable. For example, a removable hard drive may be used for persistent storage 608. Additional examples include optical and magnetic disks, thumb drives, and smart cards that are inserted into a drive for transfer onto another computer-readable storage medium that is also part of persistent storage 608.

Communications unit 610, in the examples, provides for communications with additional data processing systems or devices, including computing device 104. In the examples, communications unit 610 includes one or more network interface cards. Communications unit 610 may provide communications through the use of either or both physical and wireless communications links.

I/O interface(s) 612 allows for input and output of data with additional devices that may be connected to computing device 104. For example, I/O interface 612 may provide a connection to external devices 616 such as a keyboard, keypad, camera, a touch screen, and/or some additional suitable input device. External devices 616 may also include portable computer-readable storage media such as, for example, thumb drives, portable optical or magnetic disks, and memory cards. Software and data used to practice embodiments of the present invention, e.g., extraction program 110 and concatenate program 112 may each be stored on such portable computer-readable storage media and may be loaded onto persistent storage 608 of computing device 104 via I/O interface(s) 612 of computing device 104. I/O interface(s) 612 also connect to a display 618.

Display 618 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or additional freely propagating electromagnetic waves, electromagnetic waves propagating through a waveguide or additional transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In additional embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

The computer readable program instructions may be provided to a processor of a general purpose computer, special purpose computer, or additional programmable data processing apparatus to produce a machine, such that the instructions, which execute via the processor of the computer or additional programmable data processing apparatus, create means for implementing the functions/acts specified in the flowchart and/or block diagram block or blocks. The computer readable program instructions may also be stored in a computer readable storage medium that may direct a computer, a programmable data processing apparatus, and/or additional devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, additional programmable data processing apparatus, or additional device to cause a series of operational steps to be performed on the computer, additional programmable apparatus or additional device to produce a computer implemented process, such that the instructions which execute on the computer, additional programmable apparatus, or additional device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a frame, segment, or table of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method for interpreting a matrix code with increased information density, the method comprising:
   identifying, by one or more processing devices, a first portion of an extended matrix code and a second portion of the extended matrix code, wherein each portion of the extended matrix code has a different combination of a position marker, wherein the position marker indicates how to position a matrix code to allow the matrix code to be properly read, and a location marker, wherein the location marker indicates one or more edges or corners of a matrix code;
   extracting, by one or more processing devices, the first portion of the extended matrix code and the second portion of the extended matrix code from the composite matrix code based on, at least, the position marker of the first portion of the extended matrix code and the position marker of the second portion of the extended matrix code;

locating, by one or more processing devices, the at least one location marker of the first portion of the extended matrix code and the at least one location marker of the second portion of the extended matrix code;

concatenating, by one or more processing devices, the first portion of the extended matrix code and the second portion of the extended matrix code based on the location marker of the first portion of the extended matrix code and the location marker of the second portion of the extended matrix code; and generating, by one or more processing device, the extended matrix code.

2. The method of claim 1, wherein the first portion of the extended matrix code and the second portion of the extended matrix code are located within a composite matrix code, wherein the composite matrix code is of a smaller size than the extended matrix code.

3. The method of claim 2, wherein the composite matrix code is printed under a lenticular lens, wherein the first portion of the extended matrix code is viewable from a first viewing angle range and wherein the second portion of the extended matrix code is viewable from a second viewing angle range.

4. The method of claim 1, wherein the first portion of the extended matrix code and the second portion of the extended matrix code have substantially similar spatial dimensions.

5. The method of claim 1, further comprising:
extracting, by one or more processing devices, information from the extended matrix code, wherein a first portion of the extracted information is located on the first portion of the extended matrix code and wherein a second portion of the extracted information is located on the second portion of the extended matrix code.

6. The method of claim 1, further comprising:
adjusting, by one or more processing devices, the size of the first portion of the extended matrix code based on the position marker of the first portion of the extended matrix code and the position of the second portion of the extended matrix code.

7. A computer program product for interpreting a matrix code with increased information density, the computer program product comprising:
one or more computer readable storage media and program instructions stored on the one or more computer readable storage media, the program instructions comprising:
program instructions to identify a first portion of an extended matrix code and a second portion of the extended matrix code, wherein each portion of the extended matrix code has a different combination of a position marker, wherein the position marker indicates how to position a matrix code to allow the matrix code to be properly read, and a location marker, wherein the location marker indicates one or more edges or corners of a matrix code;
program instructions to extract the first portion of the extended matrix code and the second portion of the extended matrix code from the composite matrix code based on, at least, the position marker of the first portion of the extended matrix code and the position marker of the second portion of the extended matrix code;
program instructions to locate the at least one location marker of the first portion of the extended matrix code and the at least one location marker of the second portion of the extended matrix code;
program instructions to concatenate the first portion of the extended matrix code and the second portion of the extended matrix code based on the location marker of the first portion of the extended matrix code and the location marker of the second portion of the extended matrix code; and
program instructions to generate the extended matrix code.

8. The computer program product of claim 7, wherein the first portion of the extended matrix code and the second portion of the extended matrix code are located within a composite matrix code, wherein the composite matrix code is of a smaller size than the extended matrix code.

9. The computer program product of claim 8, wherein the composite matrix code is printed under a lenticular lens, wherein the first portion of the extended matrix code is viewable from a first viewing angle range and wherein the second portion of the extended matrix code is viewable from a second viewing angle range.

10. The computer program product of claim 7, wherein the first portion of the extended matrix code and the second portion of the extended matrix code have substantially similar spatial dimensions.

11. The computer program product of claim 7, further comprising:
program instructions, stored on the one or more computer readable storage media, to extract information from the extended matrix code, wherein a first portion of the extracted information is located on the first portion of the extended matrix code and wherein a second portion of the extracted information is located on the second portion of the extended matrix code.

12. The computer program product of claim 7, further comprising:
program instructions, stored on the one or more computer readable storage media, to adjust the size of the first portion of the extended matrix code based on the position marker of the first portion of the extended matrix code and the position marker of the second portion of the extended matrix code.

13. A computer system for interpreting a matrix code with increased information density, the computer system comprising:
one or more computer processing devices, one or more computer readable storage media, and program instructions stored on the one or more computer readable storage media for execution by, at least one of the one or more processing devices, the program instructions comprising:
program instructions to identify a first portion of an extended matrix code and a second portion of the extended matrix code, wherein each portion of the extended matrix code has a different combination of a position marker, wherein the position marker indicates how to position a matrix code to allow the matrix code to be properly read, and a location marker, wherein the location marker indicates one or more edges or corners of a matrix code;
program instructions to extract the first portion of the extended matrix code and the second portion of the extended matrix code from the composite matrix code based on, at least, the position marker of the first portion of the extended matrix code and the position marker of the second portion of the extended matrix code;

program instructions to locate the at least one location marker of the first portion of the extended matrix code and the at least one location marker of the second portion of the extended matrix code;

program instructions to concatenate the first portion of the extended matrix code and the second portion of the extended matrix code based on the location marker of the first portion of the extended matrix code and the location marker of the second portion of the extended matrix code; and program instructions to generate the extended matrix code.

14. The computer system of claim 13, wherein the first portion of the extended matrix code and the second portion of the extended matrix code are located within a composite matrix code, wherein the composite matrix code is of a smaller size than the extended matrix code.

15. The computer system of claim 14, wherein the composite matrix code is printed under a lenticular lens, wherein the first portion of the extended matrix code is viewable from a first viewing angle range and wherein the second portion of the extended matrix code is viewable from a second viewing angle range.

16. The computer system of claim 13, wherein the first portion of the extended matrix code and the second portion of the extended matrix code have substantially similar spatial dimensions.

17. The computer system of claim 13, further comprising:

program instructions, stored on the computer readable storage media for execution by at least one of the one or more processors, to extract information from the extended matrix code, wherein a first portion of the extracted information is located on the first portion of the extended matrix code and wherein a second portion of the extracted information is located on the second portion of the extended matrix code.

* * * * *